United States Patent
Ghabra et al.

(10) Patent No.: US 7,208,912 B2
(45) Date of Patent: Apr. 24, 2007

(54) INDUCTIVE BATTERY RECHARGING SYSTEM WITH PEAK VOLTAGE DETECTION

(75) Inventors: Riad Ghabra, Dearborn Heights, MI (US); Qingfeng Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 383 days.

(21) Appl. No.: 10/949,498

(22) Filed: Sep. 24, 2004

(65) Prior Publication Data

US 2006/0071632 A1 Apr. 6, 2006

(51) Int. Cl.
*H01M 10/44* (2006.01)
*H01M 10/46* (2006.01)
(52) U.S. Cl. ..................... 320/108
(58) Field of Classification Search .......... 320/108, 320/109
See application file for complete search history.

(56) References Cited

U.S. PATENT DOCUMENTS 5,122,729 A 6/1992 Itoga et al.
6,184,651 B1 2/2001 Fernandez et al.

FOREIGN PATENT DOCUMENTS

| EP | 1022840 | 7/2000 |
|----|---------|--------|
| EP | 1408456 | 4/2004 |
| JP | 10174206 | 6/1998 |
| WO | WO 94/28560 | 12/1994 |

*Primary Examiner*—Edward H. Tso
(74) *Attorney, Agent, or Firm*—MacMillan, Sobanski & Todd, LLC

(57) ABSTRACT

A method is provided for inductively charging a rechargeable battery of a portable device in a vehicle via a primary circuit that includes a primary inductive coil, a secondary circuit that includes a secondary inductive coil, and a rectifying circuit electrically coupled to the rechargeable battery. A primary coil is energized with a supply voltage. A frequency of the supply voltage is varied. A peak voltage of the primary circuit is detected. The frequency of the supply voltage is adjusted to a respective frequency associated with the peak voltage.

12 Claims, 4 Drawing Sheets ual Applications

Not Applicable.

STATEMENT REGARDING FEDERALLY SPONSORED RESEARCH

Not Applicable.

BACKGROUND OF THE INVENTION

1. Field of the Invention

The present invention relates in general to a cellular telephone battery recharging system, and more particularly, to a vehicular cellular telephone rechargeable system that maximizes the voltage of the primary coil provided to the rechargeable battery of the cellular telephone.

2. Description of the Related Art

It is well known that contactless charging systems use inductive charging to recharge portable devices without the need for electrically connecting one or more contact terminals for transferring electrical energy to the portable device. Examples of such portable devices include cordless telephones, electronic toothbrushes, and other electronic convenience devices. Such devices typically include a base charging unit and a portable device. The base charging unit includes a primary inductive coil electrically connected to a power source. The power source provides an alternating current (AC) voltage supply (or a direct current voltage supply inverted to produce an AC voltage supply) for energizing the primary inductive coil. The primary inductive coil generates an electromagnetic field for inducing an electrical charge on a secondary inductive coil within in the portable device. The secondary inductive coil may be located within a rechargeable battery housing or elsewhere in the portable device. The energy induced in the secondary inductive coil is then converted to a DC voltage supply for charging the rechargeable battery.

The transfer of inductive energy between the primary coil and the secondary coil may be diminished if the positioning of the secondary coil or the electrical tolerances of the charging components are not strictly maintained. The transfer of inductive energy may further be diminished if foreign objects are positioned in the electromagnetic charging field. The placement of objects within the electromagnetic charging field causes electromagnetic disturbances within the field thereby reducing the strength of the field, and as a result, the reducing the energy transferable to the secondary coil.

SUMMARY OF THE INVENTION

The present invention has the advantage of maintaining a peak voltage provided to a primary inductive coil for inducing a voltage in a secondary inductive coil for charging a rechargeable battery despite the presence of a foreign object disposed in the electromagnetic field generated by the primary inductive coil.

In one aspect of the present invention, a method is provided for inductively charging a rechargeable battery of a portable device in a vehicle via a primary circuit that includes a primary inductive coil, a secondary circuit that includes a secondary inductive coil, and a rectifying circuit electrically coupled to the rechargeable battery. A primary coil is energized with a supply voltage. A frequency of the supply voltage is varied. A peak voltage of the primary circuit is detected. The frequency of the supply voltage is adjusted to a respective frequency associated with the peak voltage.

DETAILED DESCRIPTION OF PREFERRED EMBODIMENTS

Figure 1:
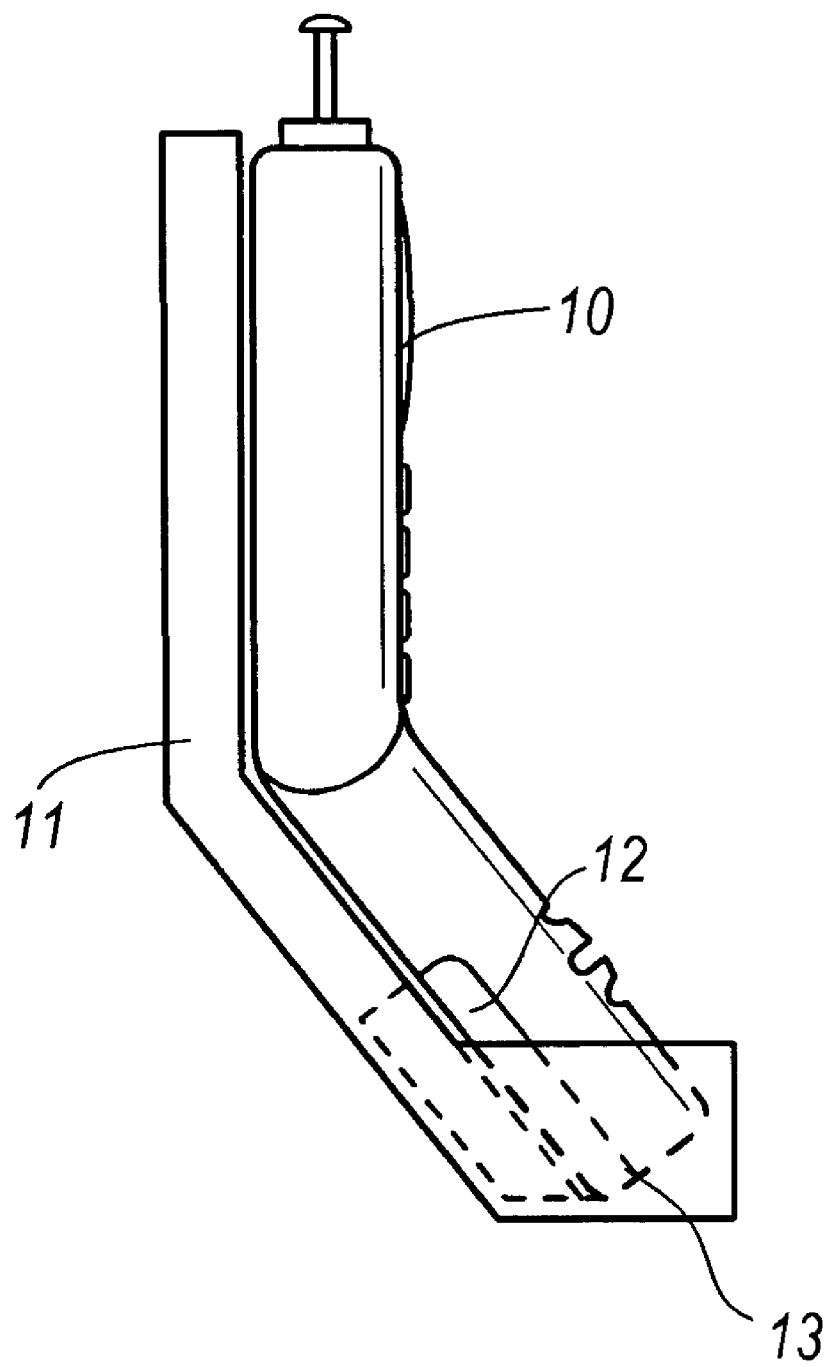
FIG. 1 is a side view of a cellular telephone and a base charging unit according to a first preferred embodiment of the present invention.

Referring now to the Drawings and particularly to FIG. 1, there is shown a side view of a cellular telephone 10 and a vehicular base charging unit 11 according to the present invention. The cellular telephone 10 is a portable communication device used for transmitting and receiving wireless communication signals. When the cellular telephone 10 is remotely detached from the base charging unit 11, the cellular telephone 10 is powered by a power source such as a rechargeable battery 12. The rechargeable battery 12 is encased in a housing 13 for concealment and protection from exterior elements. The rechargeable battery 12 is re-chargeable while attached to the cellular telephone 10 or may be recharged while detached from the cellular telephone 10 if circuitry required for receiving and rectifying the induced voltage is integrated within the housing 13.

The present invention utilizes contactless charging that uses a primary inductive coil 18 (shown in FIG. 2) in the base charging unit 11 for electromagnetically coupling with a secondary inductive coil 17 (shown in FIG. 2) that is disposed in a cellular telephone 10. The base charging unit 11 applies a supply voltage to a primary circuit which includes the primary inductive coil 18. A magnetic field created by the primary inductive coil 18 induces a voltage within a secondary inductive coil 17 disposed in the cellular telephone 10.

The base charging unit 11 is typically used as a docking port to cradle the cellular telephone 10 for aligning the primary inductive coil 18 and the secondary inductive coil 17 such that electromagnetic energy is transmittable between the primary inductive coil 18 of the base charging unit 11 and the secondary inductive coil 17 of the cellular telephone 10. When properly positioned within the cradle of the docking port, vector components of the energy field of the transmitting primary inductive coil 18 and vector components of the energy field of the absorbing secondary inductive coil 17 are aligned for energy transfer. Charging energy excited within secondary inductive coil 17 is rectified for charging the rechargeable battery 12. A foreign object disposed within the electromagnetic field between the cellular telephone 10 and the charging port 11 may alter the resonant frequency of the primary circuit causing it to increase its power loss.

For a respective supply voltage, outputting the supply voltage at the natural frequency (i.e., resonant frequency) of an LC circuit will cancel the reactances (of the capacitor and inductor) since the voltage/current output from the capacitor and inductor are 90 degrees out of phase with each other. As a result, the circuit load becomes a resistive load that is purely resistive. This follows that the energy output of the circuit will have its peak amplitude (i.e., for a respective supplied voltage) when the respective supply voltage is being generated at the resonant frequency of the LC circuit. However, if a foreign object is inserted within the electromagnetic field this could de-tune the primary inductive coil. This changes the frequency of the LC circuit to a point other than the original resonating frequency, and as a result, the supply voltage output to the LC circuit at the original resonating frequency no longer provides the peak amplitude as the impedance (i.e., with the addition of the foreign object disposed in the electromagnetic field) has changed thereby changing the resonant frequency of the LC circuit.

Figure 2:
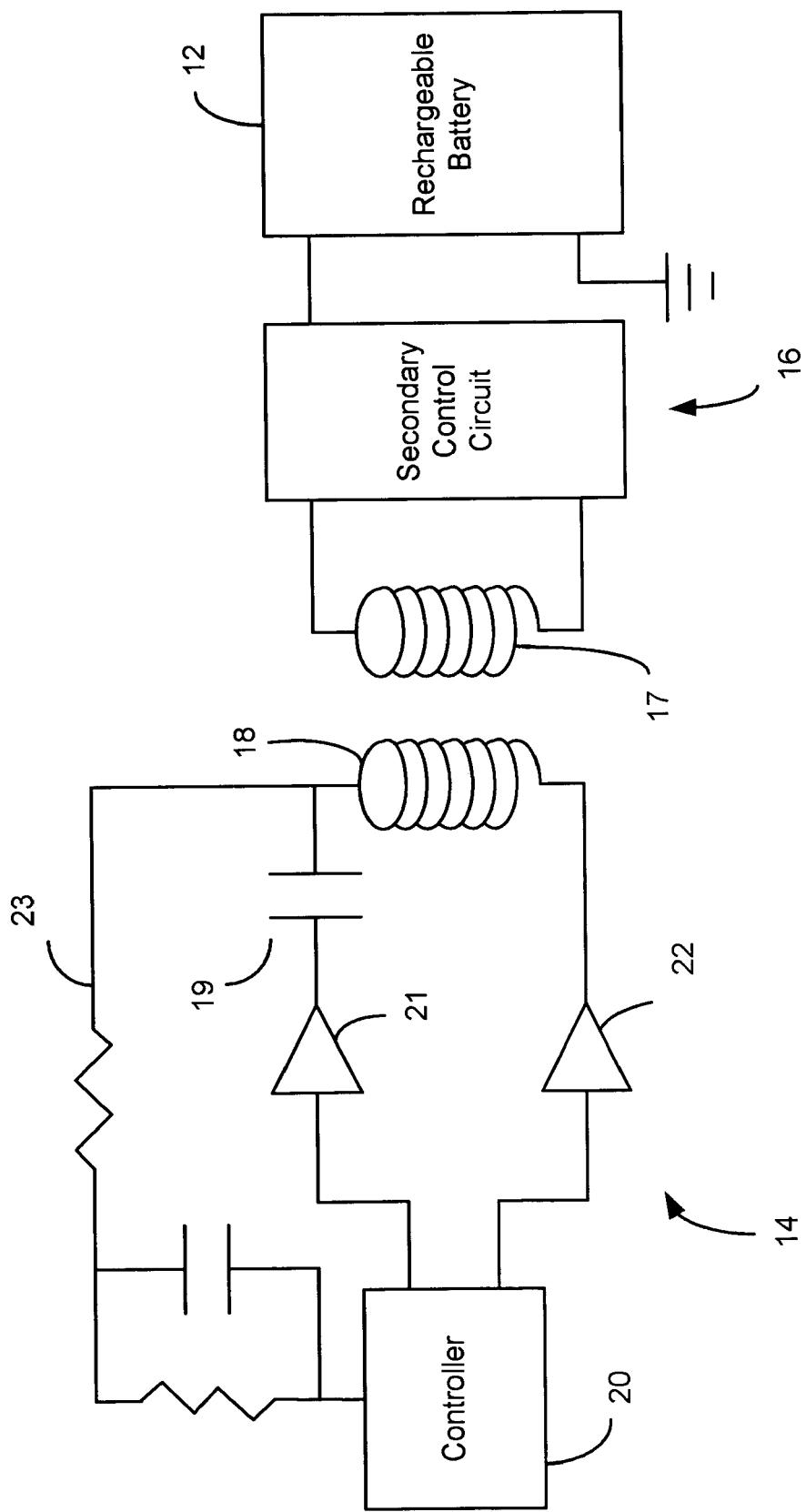
FIG. 2 is a schematic of an electrical circuit of the primary circuit of an inducting charging apparatus according to a first preferred embodiment of the present invention.

To compensate for sudden changes in the impedance of the LC circuit in response to a foreign object placed within the electromagnetic field, it is desirable to monitor energy feedback from the primary inductive coil for determining what the optimum supply voltage frequency should be set to. FIG. 2 illustrates an electrical schematic for providing energy feedback of the primary inductive coil 18 and for adjusting the supply voltage in response to changing impedance. A primary circuit 14 includes a controller 20 for providing drive signals to driver 21 and driver 22 for applying a selectable voltage waveform to the capacitor 19 and primary inductive coil 18 for energizing the primary inductive coil 18 at a respective voltage and frequency. The primary circuit 14 is a resonant circuit where the constants of the circuit are selected for maximum response at a respective frequency In the preferred embodiment, the controller 20 is a microprocessor. Initially, the controller 20 provides the drive signals to generate the voltage at a resonant frequency of the primary circuit 14. If a foreign object is disposed within or withdrawn from the electromagnetic field, then the impedance of the primary circuit 14 changes in response to the presence or non-presence of the foreign object. The changed impedance will shift the resonance frequency to a new frequency setting. The voltage supplied to the primary inductive coil 18 may be optimized if the frequency of the supply voltage is adjusted to the new frequency setting. To determine the new frequency setting (i.e., resonance frequency of the changed impedance circuit), the frequency of the supply voltage is varied. The controller 20 provides control signals to driver 21 and 22 to vary the frequency of the supply voltage. In a preferred embodiment, the peak voltage may be determined by varying the frequency over a predetermined bandwidth. The primary circuit 14 includes a feedback circuit 23 for sensing coil voltage at the primary inductive coil 18. The controller 20 monitors the voltage feedback of the primary inductive coil 18 over the varied frequencies for determining which frequency generates the peak voltage. Preferably, the controller 20 will store in memory the first monitored frequency and associated voltage reading. As the voltage is varied, if a higher voltage is detected at a next varied frequency the controller will delete the data stored in memory and replace it with the higher voltage reading at its associated frequency. The controller may either continuously adjust the frequency of the supply voltage each time a higher voltage is detected or the controller may wait until a predetermined bandwidth is scanned and then adjust the frequency of the supply voltage to the respective frequency associated with the voltage reading stored in memory. Alternatively, the controller 20 may store all voltage readings of each varied frequency and then determine which frequency generates the highest peak voltage after the frequency range has been varied.

In another preferred embodiment, the peak voltage is detected by varying the frequency of the supply voltage and monitoring for a change of the voltage feedback signal from the primary inductive coil 18. When a voltage change such as a change in a sign of the slope (that is positive to negative or vice versa) of the voltage feedback signal is detected, the controller 20 determines the frequency at which the sign of the slope changed. This frequency at which at which the sign of the slope changes is determined the peak voltage.

In response to detecting the peak voltage by varying the frequency, the controller 20 adjusts the frequency of the supply voltage to a respective frequency associated with the peak voltage. Thereafter, the controller 20 continuously samples the primary inductive coil voltage by varying the frequency of the supply voltage, detecting the peak voltage, and if necessary, re-adjusting the frequency of the supply voltage to the respective frequency corresponding to the detected peak voltage. This maintains the optimum amount of charged energy (i.e., for a respective voltage setting) induced in the secondary inductive coil 17 of the secondary circuit 16 for charging the rechargeable battery 12.

Figure 3:
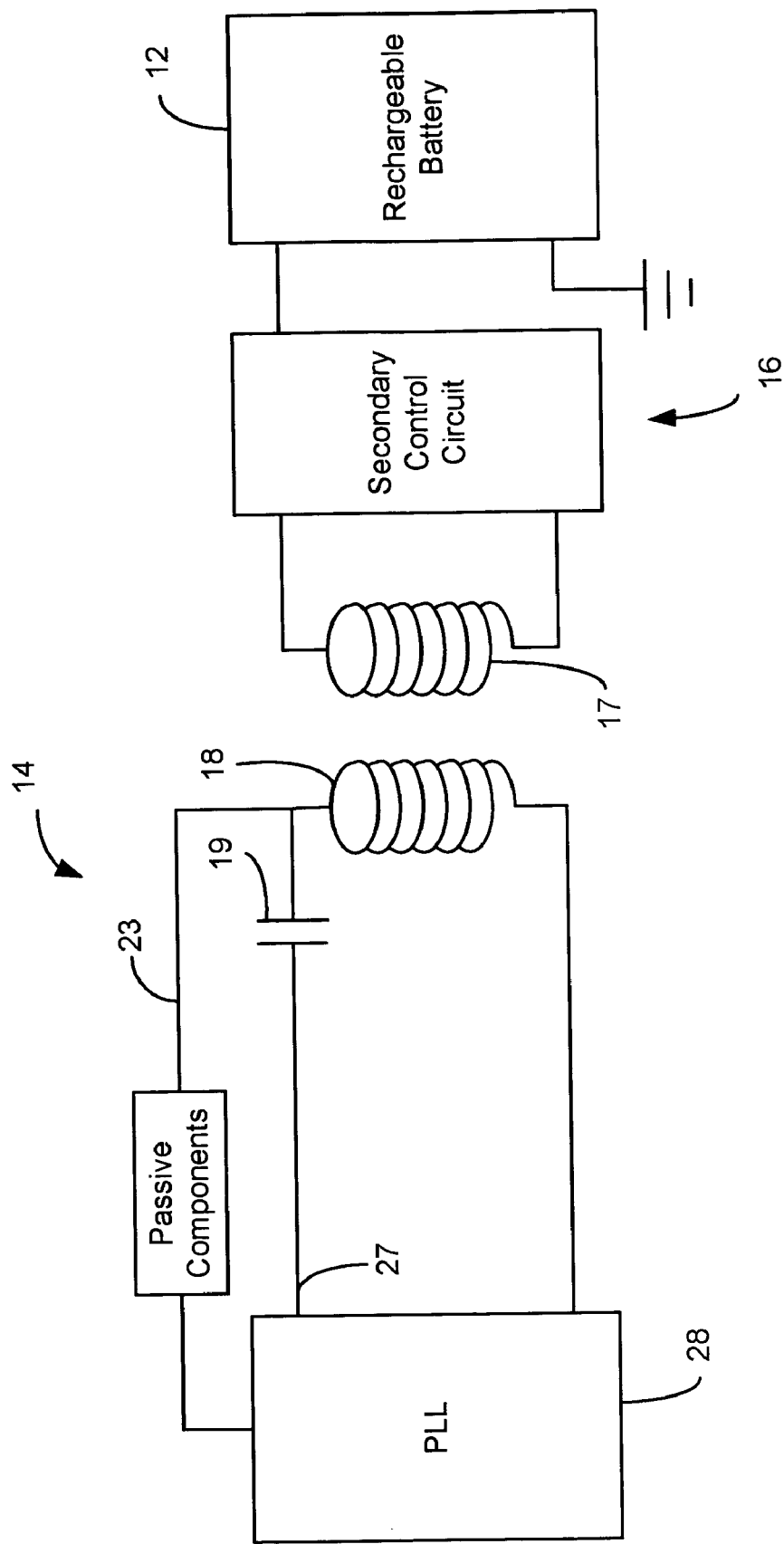
FIG. 3 is a schematic of an electrical circuit of the primary circuit of an inducting charging apparatus according to a second preferred embodiment of the present invention.

FIG. 3 illustrates an electrical schematic of the primary circuit according to a second preferred embodiment. A control device such as a phase locked loop (PLL) 30 is used to vary the frequency, detect the peak voltage, and make frequency adjustments. The PLL 28 locks on to the resonance formed by the primary inductive coil 18. The PLL 28 is a circuit with either a voltage driven oscillator whose output phase is automatically adjusted to maintain synchronization with a frequency of an input reference signal. In this embodiment, the input reference signal is the feedback circuit 23 received from the primary inductive coil 18. The PLL includes a comparator for determining a phase difference between the output circuit 27 of the PLL 28 and the input signal of the feedback circuit 23 (i.e., voltage at the primary inductive coil 18). Any error detected between the phase difference of the output circuit 27 and the input signal of the feedback circuit 23 will re-adjust the frequency of the supply voltage to maintain synchronization with the input signal of the feedback circuit 23. Voltage measurements from the primary inductive coil 18 are continuously supplied to the PLL 28 via feedback 23. As the frequency is varied, the PLL 28 continuously monitors and adjusts the frequency of the output to maintain synchronization with the input signal. If a respective voltage input signal of the feedback circuit 23 (at a respective frequency) is lower than the voltage output of the PLL 28, the PLL 28 will not adjust the frequency as this would result in a decreased supply voltage output. The PLL 28 will adjust the frequency only when voltage from input signal of the feedback circuit 23 is the same or higher than the voltage output of the PLL 28. An ASIC (application-specific integrated circuit) chip may be used to perform the PLL functions and controls in this preferred embodiment.

Figure 4:
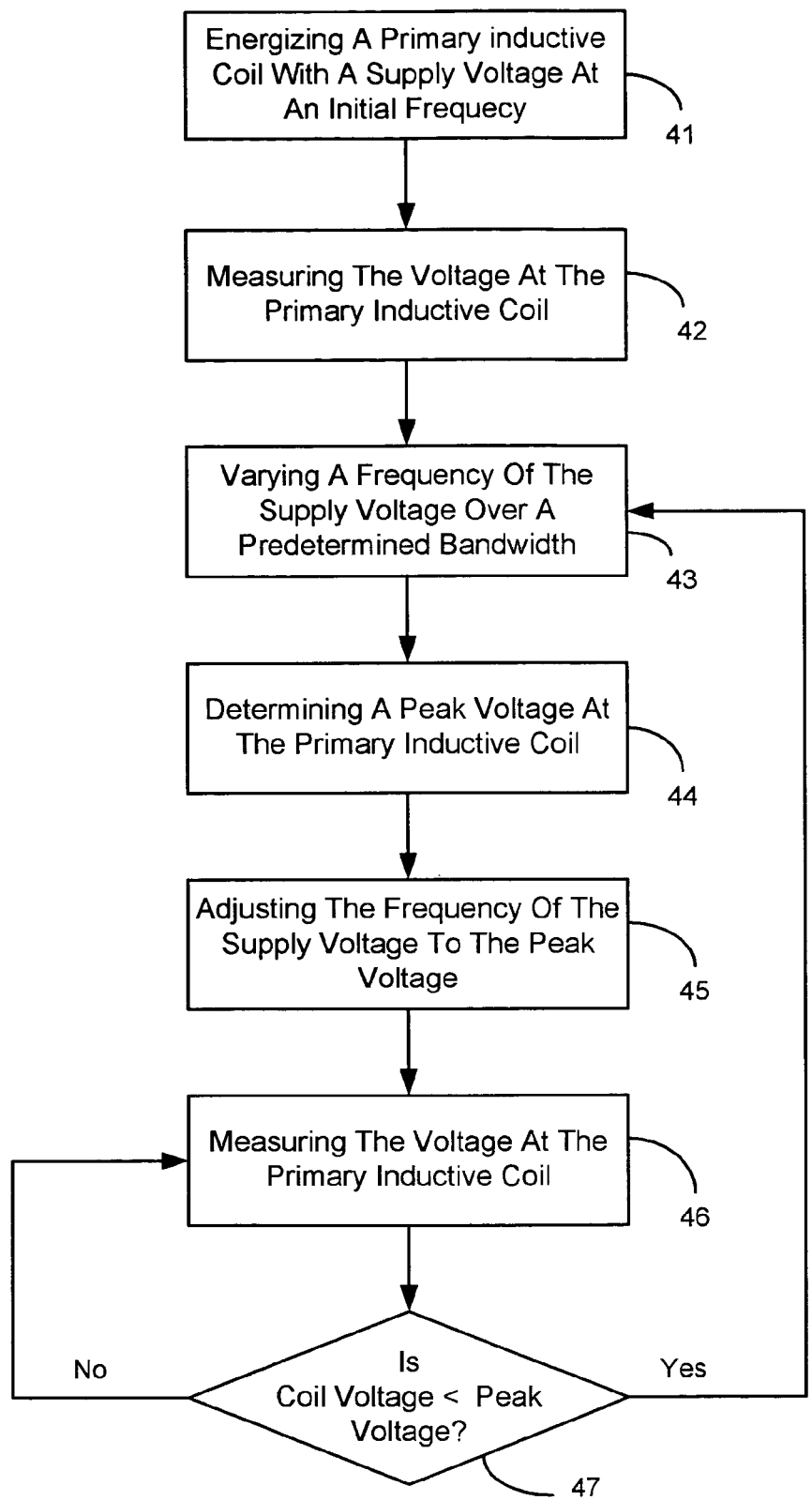
FIG. 4 illustrates a method for adjusting a supply voltage of a charging apparatus of the present invention.

FIG. 4 illustrates a preferred embodiment of a method for maximizing the voltage across the primary inductive coil for inductively charging a rechargeable battery. In step 41, a primary circuit of a base charging unit is energized by a supply voltage. The primary circuit which includes the primary inductive coil. Applying a voltage across the primary inductive coil generates an electromagnetic field for inducing a voltage in a secondary inductive coil. The primary inductive coil along with other reactance and resistive elements produce an impedance for the primary circuit. Energizing the primary inductive coil with a supply voltage at the resonant frequency of the primary circuit cancels the reactance elements thereby leaving a purely resistive circuit at which a peak voltage is applied to the primary inductive coil.

In step 42, the supply voltage at the primary coil is measured. If a foreign object is disposed in the electromagnetic field, then the impedance of the circuit changes, as does the resonant frequency. To determine the optimum frequency (i.e., the new resonant frequency due to the changed impedance) for supplying the peak voltage to the primary inductive coil, the frequency of the supply voltage is varied over a predetermined bandwidth in step 43. Varying the frequency over the predetermined bandwidth allows the controller to determine at what frequency the amplitude of the voltage at the primary inductive coil is peaking. The voltage at the primary inductive coil is measured while the frequency is varied.

In step 44, a determination is made as to what frequency produces a peak voltage across the primary inductive coil. In step 46, the frequency of the supply voltage is adjusted to the frequency as determined in step 45. In step 46, the voltage at the primary inductive coil is measured. In step 47, a determination is made whether the measured coil voltage is less than the peak voltage as determined in step 44. This indicates whether the voltage across the primary inductive coil has changed. If a determination is made that the coil voltage is equal to the peak voltage, then the voltage across the primary inductive coil is unchanged and a return is made to step 46 to continue measuring the voltage at the primary inductive coil for any voltage changes. If a determination was made in step 47 that the coil voltage is less than the peak voltage, then voltage across the primary inductive coil has changed. This voltage change indicates that the impedance of the primary inductive circuit has changed and that the supply voltage is not generating at the resonance frequency. This voltage change may be the result of a foreign object disposed in the electromagnetic field. A return is made to step 43 to vary the frequency within a predetermined bandwidth for determining which frequency will generate the peak voltage at the primary inductive coil.

What is claimed is:

1. A method of inductively charging a rechargeable battery of a portable device in a vehicle via a primary circuit that includes a primary inductive coil, a secondary circuit that includes a secondary inductive coil, and a rectifying circuit electrically coupled to said rechargeable battery, said method comprising the steps of:
   energizing said primary inductive coil with a supply voltage;
   varying a frequency of said supply voltage;
   detecting a peak voltage of said primary inductive coil; and
   adjusting said frequency of said supply voltage to a respective frequency associated with said peak voltage.

2. The method of claim 1 wherein said step of varying said frequency of said supply voltage includes sweeping said frequency within a predetermined bandwidth.

3. The method of claim 1 wherein a controller determines said frequency adjustment and automatically adjusts said frequency of said supply voltage.

4. The method of claim 1 wherein a phase locked loop determines said frequency adjustment and automatically adjusts said frequency of said supply voltage.

5. A method of inductively charging a cellular telephone rechargeable battery in a vehicle via a primary circuit that includes a primary inductive coil, a secondary circuit that includes a secondary inductive coil, and a rectifying circuit electrically coupled to said rechargeable battery, said method comprising the steps of:
   energizing said primary inductive coil with a supply voltage;
   varying a frequency of said supply voltage;
   monitoring a voltage across said primary inductive coil;
   determining a peak voltage as said frequency of said supply voltage is varied across said primary inductive coil; and
   adjusting said frequency of said supply voltage to a respective frequency associated with said peak voltage.

6. The method of claim 5 wherein a controller determines said peak voltage and automatically adjusts said frequency of said supply voltage for maximizing said voltage across said primary inductive coil.

7. The method of claim 5 wherein a phase locked loop provides said peak voltage by locking on to a resonance formed by said primary inductive coil.

8. A charging system for inductively charging a rechargeable battery of a portable device in a vehicle, said charging system including a vehicle-based recharging unit that maximizes a supply voltage inductively supplied to said rechargeable battery, the system comprising:
   a primary circuit including a control device and a primary inductive coil, said control device varying a frequency of said supply voltage to said primary inductive coil, said control device detecting a peak voltage of said primary inductive coil; and
   a secondary circuit including a secondary inductive coil, said primary inductive coil inducing a voltage in said secondary inductive coil;
   wherein said control device adjusts said frequency of said supply voltage to a respective frequency associated with said peak voltage for maximizing said supply voltage inductively to said rechareable battery.

9. The charging system of claim 8 wherein said control device includes a microprocessor.

10. The charging system of claim 9 wherein said microprocessor provides a drive signal to at least one voltage driver for varying said frequency of said supply voltage.

11. The charging system of claim 8 wherein said control device includes a phase-locked loop.

12. The charging system of claim 8 wherein said frequency is varied within a predetermined bandwidth for determining said respective frequency associated with said peak voltage.

* * * * *